United States Patent [19]

Slemmons

[11] Patent Number: 4,620,499

[45] Date of Patent: Nov. 4, 1986

[54] CAM CLEAT

[76] Inventor: Arthur J. Slemmons, 19655 Redberry Dr., Los Gatos, Calif. 95030

[21] Appl. No.: 364,447

[22] Filed: Apr. 1, 1982

[51] Int. Cl.⁴ .............................................. B63B 21/04
[52] U.S. Cl. ................................ 114/218; 24/134 KB; 24/134 P
[58] Field of Search ...... 114/218; 24/134 R, 134 KA, 24/134 KB, 134 KC, 134 P; 188/65.1

[56] References Cited

U.S. PATENT DOCUMENTS

| | | | |
|---|---|---|---|
| 325,983 | 9/1885 | Smith | 24/134 KB |
| 497,900 | 5/1893 | Warner | 24/134 KB |
| 2,057,608 | 10/1936 | Carroll | 24/134 KB |
| 2,723,457 | 11/1955 | Wasilewski | 24/134 KB |
| 4,217,847 | 8/1980 | McCloud | 188/65.1 |

Primary Examiner—Sherman D. Basinger
Assistant Examiner—Thomas J. Brahan
Attorney, Agent, or Firm—Henry M. Stanley

[57] ABSTRACT

A cam cleat having opposed rotatable rope-gripping cams can be remotely operated by the action of the free end of the rope on an open rope-engaging face of a cam actuating arm, there being a rope-restraining lip overlying the rope-engaging face of the arm.

7 Claims, 11 Drawing Figures

GRIPPING

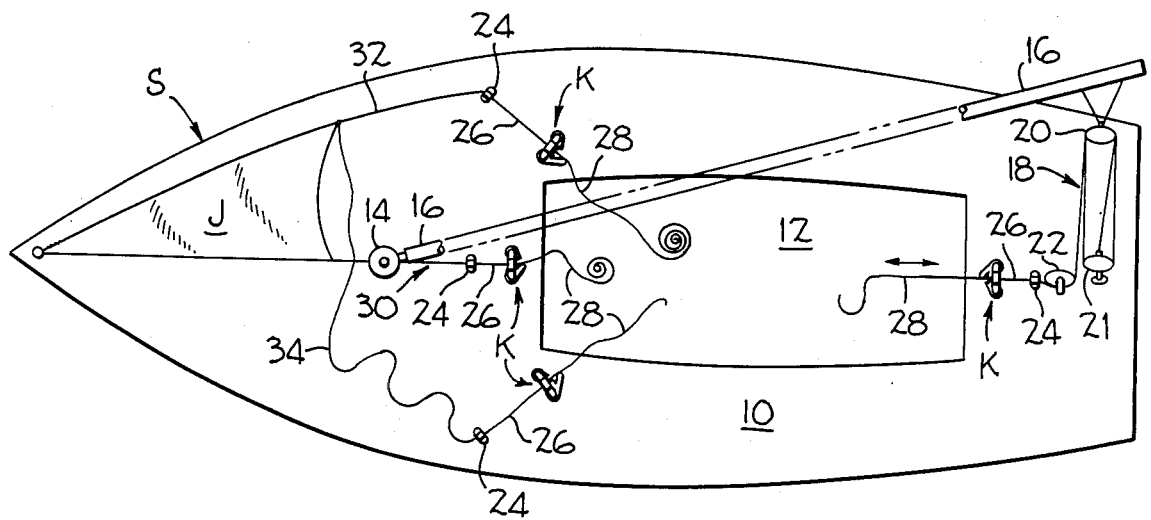
fig_1
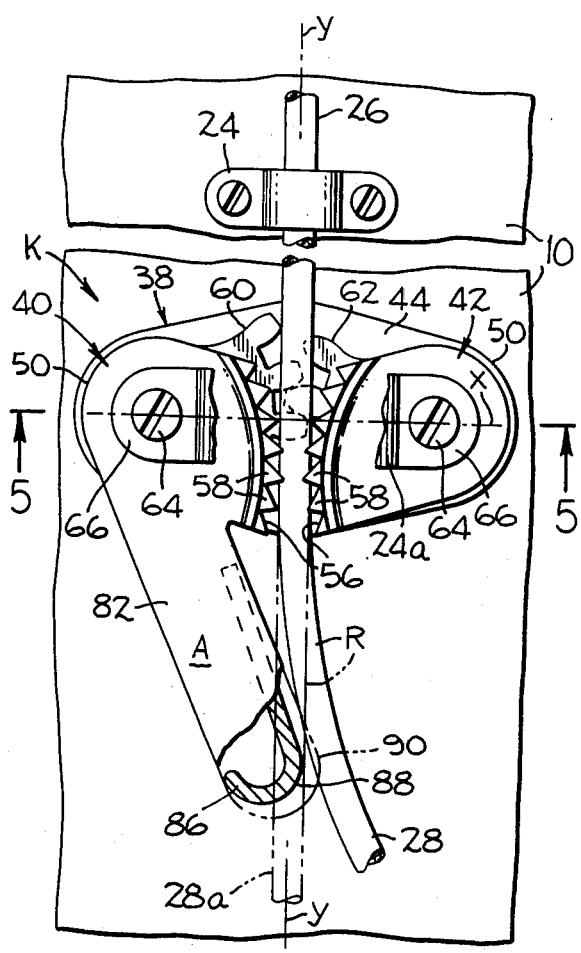
GRIPPING
fig_2
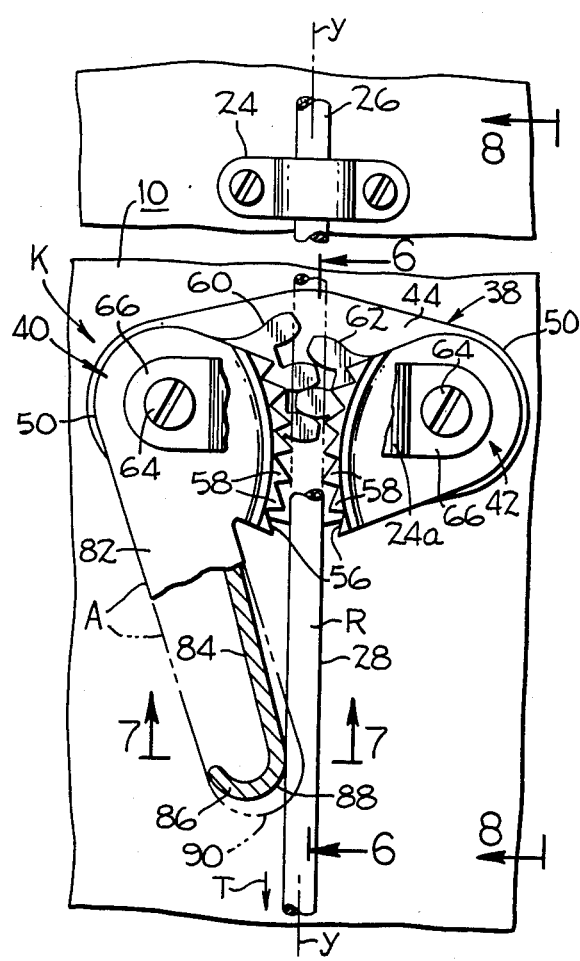
JUST RELEASED
fig_3

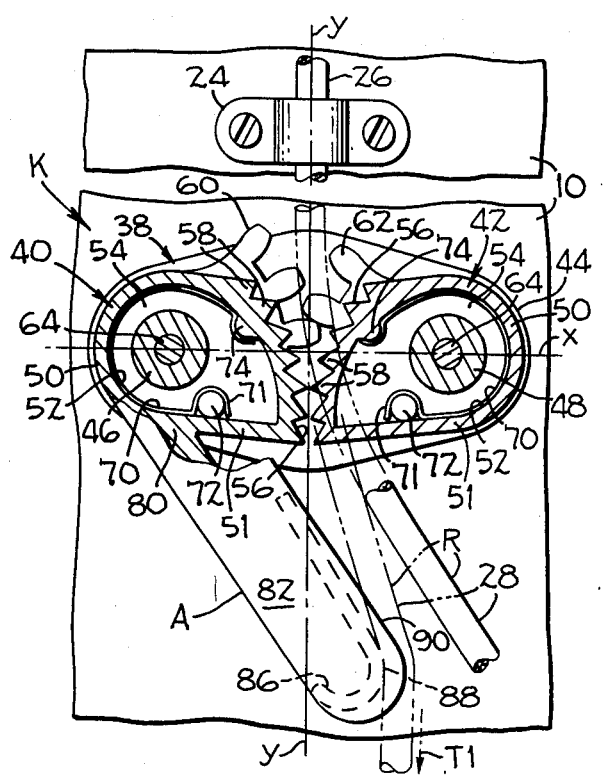
FULLY CLOSED
fig_4
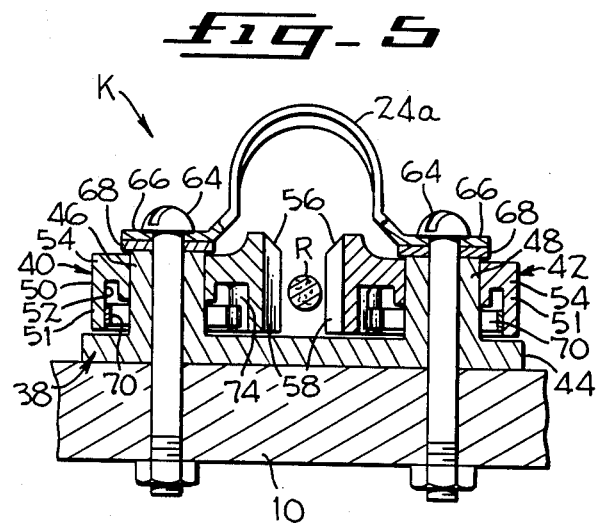
fig_5
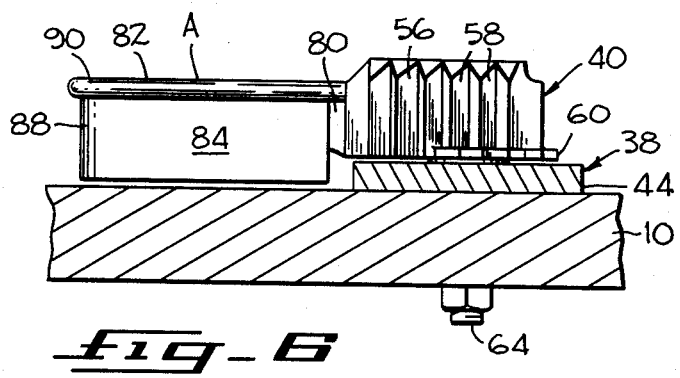
fig_6
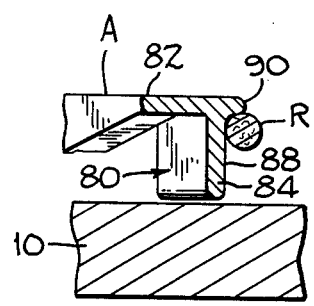
fig_7
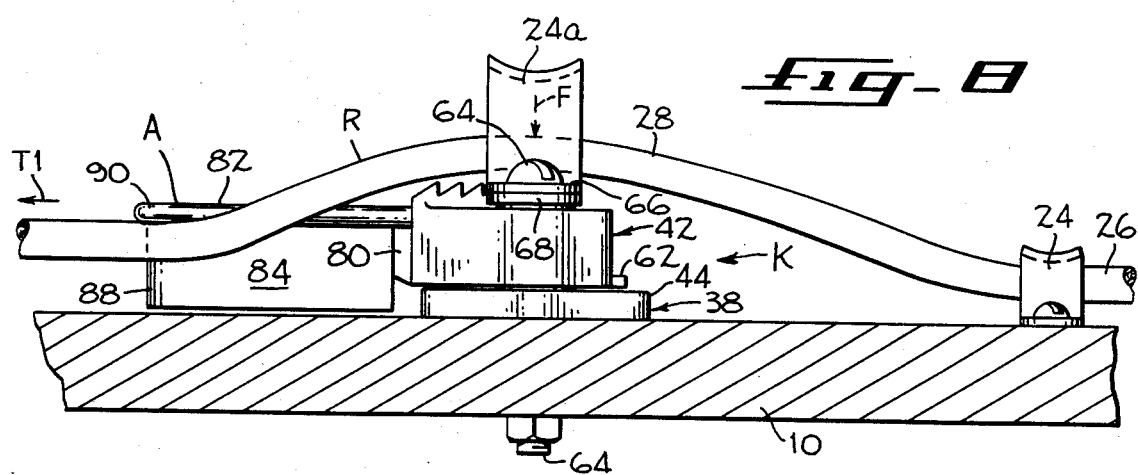
fig_8

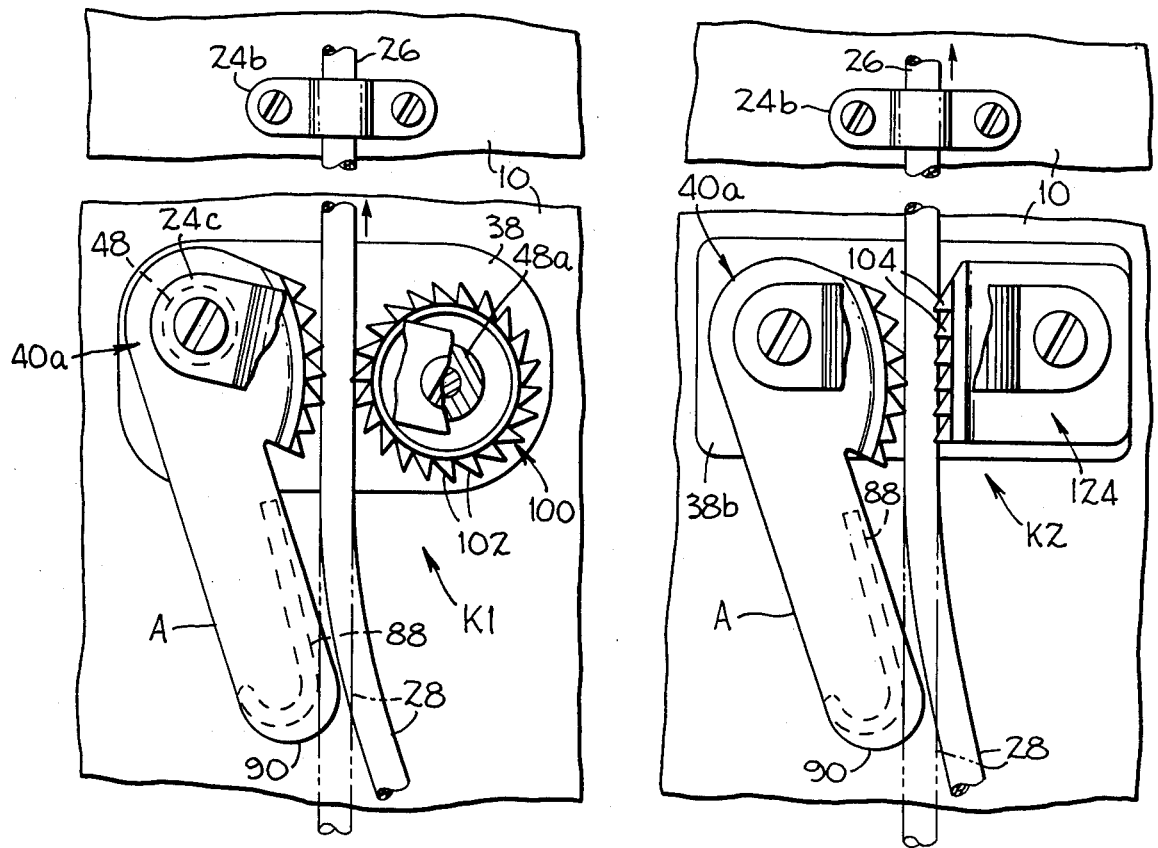
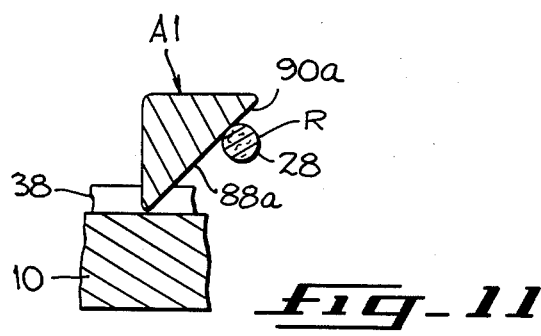

CAM CLEAT

BACKGROUND OF THE INVENTION

1. Field of the Invention

This invention relates to a cam cleat for retaining a rope under tension.

2. Description of the Prior Art

Field U.S. Pat. No. 2,750,611, Aug. 7, 1973, discloses a two-way marine hardware cam cleat employing opposed two-way grip cams which are geared together. Each cam has oppositely directed camming surfaces extending from a minimum size nip portion so that the cam cleat will restrain the standing part of a line or rope extending from either side of the cleat. The line must be lifted free of the cams for release and pay out.

Nash U.S. Pat. No. 3,765,061, Oct. 16, 1973, discloses a deck mounted marine cam cleat having opposed rope gripping cams. The cams are opened to accommodate paying out of the line by pulling the free or fall portion of the line downwardly from the plane of the deck to actuate a bell crank tongue pivotally mounted on the base plate of the cleat.

Merry U.S. Pat. No. 3,795,215, Mar. 5, 1974, discloses a marine cam cleat having opposed, spring-closed, toothed cams with the upper portion of the teeth beveled to facilitate starting of the line between the cams. The line must be lifted free of the cams for release and pay out.

Schaefer Marine Products of New Bedford, Mass., manufactures a cam cleat like that of the above Merry patent wherein the cams are geared together for simultaneous opening and closing actions.

Mueller U.S. Pat. No. 4,097,023, June 27, 1978 discloses a rope clamp pulley wherein a toothed cam is pivotally mounted on a pulley wall and has an actuating lever, the cam clamps the rope against an opposed, smooth roller mounted on the wall.

Bowers U.S. Pat. No. 812,808, Feb. 20, 1906, discloses a window sash adjuster having opposed, pivotally mounted, rope gripping dogs. A lever arm depends from one dog and has a closed annular eye for confining and guiding the rope. A synchronizing stud secured to one cam extends flat over the gap between the dogs.

SUMMARY OF THE INVENTION

The cam cleat of the present invention is disclosed as installed on a sailboat for chocking various lines or ropes, but the cleat has utility in other applications wherein the rope is to be gripped while under tension. The cam cleat can be actuated to its open or rope releasing position by "remote control". An operator grasps the free end portion of the rope and pulls it substantially straight back from the cam cleat, that is, along the "centerline" of the cleat. The cam cleat has a cantilever actuator arm projecting from a pivoted rope-gripping cam and formed with an open rope-engaging face. The face of the arm is releasably engaged by the rope and is positioned so that the rope exerts a torque on the arm in a direction for opening an associated rope gripping cam when the operator pulls the rope substantially straight back from the cam cleat.

In cases where rapid rope pay-out or take-in are desired, the operator can also free the rope entirely from its cam-gripped position by remote control, that is, by simply pulling the rope back to open the cam, followed by an upward snap or jerk on the rope. In a sailboat installation, for example, a sailor can operate a cam cleat mounted on the deck at one side of the cockpit, while he is at the other side of the cockpit, by pulling on the line. However, the direction of pull is substantially a continuation of the chocked or standing part of the line and hence the direction of pull is substantially in the plane of the deck which mounts the cam cleat. The free or fall portion of the line need not be pulled down into the cockpit in order to release the line, as is necessary with the cam cleat of the aforesaid Nash patent.

The operator can also start or re-introduce the rope into the cam cleat by remote control from convenient positions some distance from the cleat. The above modes of operation (straight-back pull, remote control release, remote control starting) basically result from the cooperation of several features of the cam cleat of the present invention.

First, the disposition of the rope-engaging face of the actuating arm relative to the rope-gripping cam surface is specially selected. It is selected so that when the cam is at its closed position but with the rope free of or removed from the cam surface, the cam actuator arm will have rotated to a position wherein the rope engaging surface of the arm is substantially "over-center" relative to the centerline of the cam cleat. The centerline of the cam cleat is tangent to the rope-gripping face of a cam at the point where the rope is gripped and is usually a prolongation of the axis of a rope under tension that is chocked by the cam cleat. With the arm in an over-center position, a pull on the free end of the rope which is substantially straight back from the cleat (along its centerline) will swing the arm in a direction which opens the cam.

Second, the arm has a rope-engaging face which has means for a restraining motion of the rope away from the base of the cleat. Preferably, the arm is formed with a rope-guiding lip which projects past and overlies the rope-engaging face on the arm. The lip restrains motion of the rope in a direction away from the base of the cam cleat while leaving the rope entirely free to move laterally clear of the arm. By thus temporarily holding the associated portion of the rope down, the lip prevents it from slipping up and off the rope-engaging face of the arm during actuation of the arm by manipulation of the end of the rope.

The above mentioned vertical restraint of the rope facilitates starting or re-introduction of the free or fall portion of the rope into a position wherein a cam can grip the rope, as will be described in detail.

Third, the rope-engaging face of the arm provides the rope-restraining or rope-guiding function as mentioned above but leaves the rope entirely free to move laterally clear of the arm. This structure of the rope-engaging face of the arm is defined as one wherein the rope-engaging face is "open". Whenever it is desired to release the rope from the cam cleat, the free end of the rope is pulled back to open the cleat and then snapped upwardly to clear the rope-engaging face of the actuating arm. An upwardly directed force on the rope is now applied directly to that portion of the rope which is gripped by a cam, lifting the rope clear of the cam. In other words, the rope is readily freed from the cam cleat by remote control because not only can the actuating arm be operated by the free end of the rope, the rope-guiding face on the actuator arm is "open" and hence the free end of the arm can be snapped clear of both the arm and the cam.

The cam cleat of the present invention makes possible a convenient, remote control, precise "inching" of the line during payout to obtain the operationally optimum sail position.

Preferably, the rope-restraining function of the rope-engaging face of the actuator arm is provided by a rope-guiding lip that overlies and projects past the rope-engaging face.

The preferred general arrangement of the cam cleat of the present invention is one having laterally opposed pivoted cams that are geared together, with an actuating arm projecting from one of the cams. A first modification of the general arrangement employs one pivoted cam with an actuating arm which is opposed by a roller. In a second modification of the general arrangement, a fixed, tooth block opposes the arm-actuated cam. The rope restraining and guiding structure, such as the rope guiding lip on the arm, is present in both modifications of the general arrangement described above.

BRIEF DESCRIPTION OF THE DRAWINGS

FIG. 1 is a plan view of a small sailboat fitted with several cam cleats of the present invention.

FIG. 2 is a plan view of a cam cleat in a rope-gripping position.

FIG. 3 is a plan view like FIG. 1 where the cam cleat has just released a rope.

FIG. 4 is a plan view wherein the cam cleat is fully closed with the rope clear of the cleat.

FIG. 5 is a section taken on line 5—5 of FIG. 2.

FIG. 6 is a section taken on line 6—6 of FIG. 3 with the rope not shown.

FIG. 7 is a partial section taken on line 7—7 of FIG. 3.

FIG. 8 is a side view of the cleat looking along line 8—8 of FIG. 3.

FIG. 9 is a plan view like that of FIG. 2 showing a modified form of cam cleat.

FIG. 10 is a plan view showing another modified form of cam cleat.

FIG. 11 is a section like that of FIG. 7, showing a modified form of actuator arm.

DESCRIPTION OF THE PREFERRED EMBODIMENT

Sailboat Installation

FIG. 1 is a schematic plan view of an installation of four cam cleats K of the present invention on a sloop S. The cam cleats are mounted on the deck 10 around the cockpit 12 and are positioned and oriented for convenient handling of the various lines by a sailor (not shown).

For example, the mast 14 mounts a boom 16 controlled by a main sheet 18 which is rigged to the deck by blocks 20 and 21 in a known manner. The main sheet is guided by a pulley 22 to a fairlead 24 through which the standing portion 26 of the sheet extends to a cam cleat K. As indicated by the double arrow, the free end or fall portion 28 of the sheet can be taken in or payed out by the sailor. In accordance with the present invention, the fall portion 28 of the sheet forms a substantial continuation of the standing portion 26 when the sheet is under tension during sheet manipulation. In the interest of simplicity, the various rigging lines, sheets, halyards, etc., will hereinafter be referred to as "ropes" and their respective standing and fall portions will be given the same reference numbers 26,28, respectively, as will their associated fairleads 24.

The mainsail (not shown) for the boom 16 is raised and lowered by a rope 30 passing through a fairlead 24 and an associated cam cleat K. The standing portion 26 of rope 30 is shown under tension or chocked and the fall portion 28 is free or loose.

The jib J is set by either of two ropes 32 or 34. In FIG. 1, the wind is from the port side so that the standing portion 26 of jib rope 32 is under tension. The opposite jib rope 34 lies loosely along its length, is not gripped by the associated cam cleat K and passes over the arm of the cleat.

Preferred Embodiment

FIGS. 2–8 show the preferred embodiment of a cam cleat K embodying the present invention. The rope R is trained through a deck fairlead 24 to be gripped by the cam cleat K. The standing and fall portions 26,28 of the rope R are shown in FIGS. 2–4. A central fairlead 24a is mounted directly on the cam cleat (FIG. 5) but a central portion of the fairlead has been broken away for clarity in FIGS. 2–4.

The cam cleat K has a base 38 which pivotally mounts an actuated cam 40 and a laterally opposed follower cam 42. The cam 40 has an actuating lever or arm A projecting rearwardly therefrom, cantilever fashion. As seen in FIGS. 4 and 5, the base 38 includes a flat mounting plate 44 having an upwardly projecting pivot post 46 for the actuated cam 40 and a laterally spaced pivot post 48 for the follower cam 42.

The two cams 40,42 are mirror images of one another and hence a description of the elements of one cam is applicable to corresponding or duplicate elements of the other cam. For this reason, duplicate cam elements are assigned the same reference characters.

As seen in FIGS. 4 and 5 and referring to the actuated cam 40, the cam has an inverted cup-shaped body 50 having formed therein a recess 52. The recess has a circumferential side wall 51 and an upper or top wall 54, best seen in FIG. 5. The upper wall 54 is apertured to receive the pivot post 46 projecting up from the mounting plate 44, thereby pivotally mounting the actuated cam 40 on the base 38.

The side wall of the cam includes a serrated rope-gripping wall 56 formed with a row of teeth 58. The roots of the teeth 58 lie along a convexly curved cam surface disposed so that the teeth 58 progressively diverge from the pivot axis of the actuated cam 40 moving in a clockwise direction along the row of teeth. The teeth 58 of the follower cam 42 diverge from the axis of the cam moving in a counterclockwise direction along the row of teeth. Thus, the rope-receiving gap between the opposed rows of teeth 58 of the cams 40 and 42 will be narrowed or widened as the cams rotate, depending on the direction of cam rotation.

In order to keep the two cams in symmetrical or mirror image positions during cam rotation, the two cams are geared together. In the preferred embodiment the cams are geared together by meshed gear sectors 60,62 projecting from the lower portions of the toothed side walls 56.

As seen in FIG. 5, cams 40 and 42 are retained on their respective pivots 46,48 by bolts 64, which also secure the cam cleat K to the deck 10. The bolts 64 pass through apertured mounting flanges 66 of the central fairlead 24a, previously mentioned. Flat washers 68 are disposed beneath the fairlead flanges 66 and are clamped against the upper ends of the pivot posts 46,48, which posts are long enough to clear the cams 40,42. Thus, the cams can turn freely on their respective pivot posts.

As best seen in FIGS. 4 and 5, the cams are lightly spring loaded for rotation toward their closed position, namely the position wherein the gap between opposed cam teeth 58 is at a minimum. In the embodiment shown, each cam is closed by a C-shaped leaf spring 70. One end 71 of each spring 70 is re-curved and presses against a fixed spring post 72 which projects up from the base flange 44. The other end of the spring is bent to receive and press against a boss 74 on the associated cam, which boss projects into the cam recess 52 from inside of the toothed cam wall 56. As viewed in FIGS. 2–4, the spring for the actuated cam 40 urges cam rotation in a counterclockwise direction, whereas the spring for the follower cam 42 urges cam rotation in the opposite or clockwise direction. Rotation of the cams in response to the spring forces narrows or closes the rope-receiving gap between opposed cam teeth.

Actuator Arm

The actuator arm A projects rearwardly in cantilever fashion from the rear or inside portion of the cam 40. The arm is formed with a body portion 80 (FIGS. 6 and 7) that projects integrally from the cam 40 and merges with a lateral upper flange 82 and with a vertical web 84. The web 84 depends from the flange 82 and has a curved distal portion 86 (FIGS. 2–4). The web 84 provides a rope-engaging face 88 which provides for actuation of the arm A by the free or fall portion 28 of the rope R.

Means are provided along the distal portion of the arm for temporarily restraining motion of the rope along the rope-engaging face of the arm in a direction away from the base of the cam cleat. Such restraint is provided during actuation of the arm A by the rope, for either releasing the grip on the rope or for starting a loose rope between the toothed cam surfaces 56. In the preferred embodiment, the arm A is provided with an upper, narrow lip 90. As best seen in FIG. 7, the lip 90 overlies the rope-engaging face 88 of the arm. Both the rope-engaging face and the lip continue on around the curved distal portion 86 of the web 84. When the free portion 28 of the rope is pulled back, the lip 90 temporarily confines, guides or restrains the rope against motion upwardly or away from the base 38 and hence restrains the rope from sliding off the rope-engaging face 88. On the other hand, the free portion 28 of the rope can be deliberately snapped or lifted entirely clear of the arm, when it is desired to completely release the rope from between the cams for rapid handling.

Operation

Gripping

FIG. 2 shows a cam cleat K gripping a rope R with the standing portion 26 tensioned by a sail or the like. The actuating arm A is free to rotate and the springs 70 (FIG. 4) urge their respective cams 40,42 toward their closed position. The cam teeth 58 are thus lightly spring-pressed against the rope. Motion of the rope along the cam teeth is resisted by frictional forces thereby causing the cams to rotate slightly towards their closed positions in response to tension on the standing portion 26 of the rope. This slight additional rotation of the cams augments the initial light frictional contact of the cam teeth 58 with the rope and develops a rope-gripping and rope restraining force which equals the pull or tension on the standing portion 26 of the rope.

In FIG. 2 the cams are gripping an average size rope. The rope-engaging face 88 of the arm is to the right of the center-line "y" of a prolongation 28a (shown in dashed line) of the standing or tensioned portion 26 of the rope. This is an "over-center" position of the rope-engaging face 88.

In the dual cam embodiment of the invention, the position of the arm A when the cams are gripping the rope can also be defined geometrically relative to the pivot axes of the cams. For example, in FIGS. 2 and 4, a dashed lateral line "x" has been drawn extending between the pivot axes for the cams 40,42. The dashed line "y" is the perpendicular bisector of the line "x". The bisector line "y" represents the center-line of the cleat.

As mentioned, in FIG. 2 the rope-engaging face 88 has swung to a position that is somewhat to the right of the bisector line "y" and hence the face is "over-center" relative to the bisector.

A cam cleat will be sized to grip a predetermined range of rope sizes and the rope-gripping position of the rope-engaging face 88 relative to a fixed reference on the cam cleat will depend upon the diameter of the rope. The aforesaid definition of arm position refers to the action of the cam cleat when gripping a rope having some nominal, average or intermediate diameter. Such diameter is preferably neither the smallest nor the largest diameter of a rope which the cam cleat will receive and grip.

If a slightly smaller rope than that illustrated were to be gripped, the rope engaging face 88 would lie somewhat to the right of the position illustrated in FIG. 2 and hence that face would be in a somewhat more "over-center" position, as compared to the position illustrated in FIG. 2. If a slightly larger rope were gripped, the arm would be somewhat less over-center. Preferably the rope-engaging face 88 of the arm is at an "over-center" position when the cam teeth are gripping the rope.

Just Released

As seen in FIG. 3, in order to release the rope R from the toothed camming surface 56 of the cams the free end of the rope is manipulated so that the rope engages the face 88 of the arm A and lies beneath the overlying lip 90. The rope is then pulled straight back and possibly somewhat towards the left, as indicated by the arrow T. This pivots the arm A and the cam 40 clockwise, bringing the rope engaging face 88 of the arm at least to its rope release position. The cams 40 and 42 now release the rope sufficiently to release the rope for pay-out.

The free or fall portion 28 of the rope is now a prolongation of the standing portion 26 of the rope and portion 28 is hence "straight back". The centerline of the fall portion 28 of the rope coincides with the perpendicular bisector line "y" of the cam cleat. The rope engaging face 88 of the actuating arm is now in its "on-center" position.

If desired, the rope can now be removed from between the cams by "remote control" that is, by an upward jerk or flicking action on the free or fall portion 28 of the rope. If the rope is removed from between the cams, as described above, it can be started or re-positioned between the cams by "remote control" in a manner to be described presently.

Fully Closed

Referring to FIG. 4, when the free or fall portion 28 of the rope R is no longer disposed between the rows of cam teeth 58 and is clear of the arm A, the springs 70 pivot the cams 40,42 to their fully closed positions. Now the cam teeth 58 at the largest radius of the camming surface 56 are substantially at the centerline "y" and the fixed spring posts 72 are engaged by the walls 51 of the associated cam recesses 52.

The position of the rope indicated by solid lines in FIG. 4 is that wherein the rope has been flicked or pulled clear of the cams and rests loosely across the top of the cams and the arm.

Starting The Rope

If the free or fall portion 28 of the rope has been released from between the cams 40,42 as indicated by the rope portion 28 shown in solid lines in FIG. 4, the cams can be opened and the free portion of the rope can be readily started or re-introduced between the cams by "remote control".

The provision of the rope guide lip 90 overlying the rope-engaging face 88 of the arm A (FIG. 7) and the over-center position of the face 88 when the cams are fully closed, facilitate starting the rope between the cams.

The free portion 28 of the rope can be grasped manually from a position that is some convenient distance behind the cam cleat K and pulled in the direction of the arrow T1 to bring the rope into the position shown by dashed lines in FIG. 4. Here the rope has been pulled against the rope-engaging face 88 of the arm and beneath the overlying lip 90. Further pull on the rope portion 28 in the generally straight-back direction of the arrow T1 causes clockwise rotation of the arm A. This rotation of the arm will rotate the cams 40,42 in opposite directions for widening the gap between opposed cam teeth 58.

FIG. 8 illustrates the forces exerted on the free or fall portion 28 of the rope during the aforesaid rope-starting action and before the rope is brought between the cam teeth. The cam cleat and the rope are viewed from the right side of the cleat. The rope passes under tension through the deck fairlead 24, humps up over the toothed cams, and passes down under the lip 90 on the actuating arm A. As a result of the rope restraining or guiding action of the lip 90, tension applied to the rope as indicated by the arrow T1 exerts a net downward force on the humped up portion of the rope indicated by the dashed arrow F.

Since the applied tension T1 (see FIG. 4) also rotates the arm A in a clockwise direction (for opening the cams, continued application of such tension to the rope will open the cams to the rope-released position, previously described in connection with FIG. 3.

As soon as the cams have opened to at least the rope-released position shown in FIG. 3, the humped up portion of the rope substantially overlies and coincides with the enlarged gap between the cam teeth. At this time, the downward force on the rope, indicated by the arrow F in FIG. 8, will snap the rope down into the gap between the opposed cam teeth 58, thereby starting the rope between the cams. The aforesaid rope-starting action is facilitated by the beveled upper ends of the teeth 58 (FIG. 5) and by the fact that the rope is circular in section. Thus, the axis of the humped up portion of the rope need not exactly coincide with the bisector or centerline "y" of the cleat in order for the rope to snap down between the cams in the manner described.

After the rope has been started between the cams by remote control in the manner described, the free end of the rope can be swung left to increase the gap between the cam teeth, if desired, and the rope can be taken in or payed out. When the free end is loose as indicated in FIG. 2, the cam springs 70 rotate the cams toward their respective rope-gripping positions and tension on the standing portion 26 completes the gripping action, as previously described.

First Modified Form

FIG. 9 is a plan view of a cam cleat K1 representing a modified form of the present invention wherein only one pivoted cam is employed. In this modification a base plate 38a pivotally mounts a single toothed cam 40a like the cam 40, previously described. However, no synchronizing gear sectors are required for the single cam 40a. The cam 40a is on a pivot post projecting from the post 48 like the pivot 64 shown in FIGS. 4 and 5 and the cam is urged to its closed position by a spring, such as the spring 70 also shown in those Figures.

A cantilever actuating arm A projects from the cam 40a. The arm A of a form of FIG. 9 has both the structure and the function of the arm A previously described, including the rope-restraining lip 90 which overlies a rope-engaging face 88. Instead of employing a synchronized cam opposite the toothed cam 40a, the embodiment of the invention shown in FIG. 9 employs a roller 100 having teeth 102. The roller 100 is rotatably mounted on a pivot stud 48a projecting from the base 38a, as does the pivot stud 48, previously described.

A fairlead 24b bridges the gap between the cam 40a and the roller 100 and a deck fairlead 24c is provided for guiding the standing portion 26 of the rope R, as previously described. The principle difference between the single cam embodiment of FIG. 9 and that previously described is that in the single cam embodiment of FIG. 9, the cam 40a must be forced to rotate through a somewhat larger angle for a given amount of gripping indentation of the rope by the cam teeth. During pay-out or take-in of the rope, the roller rotates and does not chafe the rope.

The mode of operation of the form of FIG. 9 during rope releasing and starting operations is like that described in connection with the form of FIGS. 2–8.

Second Modified Form

FIG. 10 is a plan view of a second modified form of the invention. Like the form of FIG. 9, the cam cleat K2 of FIG. 10 employs a single toothed cam 40a having the same construction as that of the cam 40a of FIG. 9. The actuating arm A is like that of FIGS. 2–9 and has a rope restraining lip 90 overlying a rope-engaging face 88. Instead of a roller, as in FIG. 9, a fixed back-up block 124 is employed, which block is integral with or secured to the base plate 38b. The block 124 is formed with a straight row of rope-gripping teeth 104.

The mode of operation of the form shown in FIG. 10 during rope release and rope starting is basically like that of the previously described forms and need not be described in detail.

Modified Arm

FIG. 11 is a section like that of FIG. 7 showing a modified rope restraining structure for an actuator arm A1. In this form the rope-engaging face 88a is disposed at an acute angle of about 45° to about 75°, with the plane of the base 38. The rope restraining face 90a forms a continuation of the rope-engaging face 88a and hence overlies or projects laterally past the face 88a. When the free or fall portion 28 of the rope R is under tension during handling of the rope, the rope-restraining portion 90a restrains motion of the rope portion 28 along the arm in a direction away from the base 38, as does the lip 90 previously shown. As before, the portion 28 of the rope can be lifted or flicked clear of the arm A1 when it is desired to clear the rope from between an associated cam or cams (not shown).

Having completed a detailed description of the preferred and modified embodiments of cam cleats embodying the present invention, it can be seen that I have provided a cam cleat which can be rapidly and conveniently operated by "remote control" utilizing a free or fall portion of the rope. The cam cleat can be actuated to free a gripped rope for taking in or payout by substantially a straight back pull, the rope can be flicked clear of the cam cleat arm and the rope can be started or re-introduced into the cam cleat from convenient distance positions behind the cleat.

Although the best mode contemplated for carrying out the present invention has been herein described, it will be apparent that modification and variations may be made without departing from what is regarded to be the subject matter of the invention.

What is claimed is:

1. A cam cleat of the type having a base, laterally opposed rope gripping members mounted on said base, one of said members having a cam rope gripping surface, pivot means for mounting said one member on said base so that rotation of said one member moves said cam surface toward and away from a closed position relative to the opposing rope gripping member, a spring urging said cam surface toward said closed position, and an actuating arm projecting from said one member in a direction substantially parallel to the base and in an overcenter position when in said closed position, wherein a rope gripped by said cam rope gripping surface has a standing portion extending in a direction away from the direction of projection of said actuating arm and a fall portion extending in the direction of projection of said actuating arm, the improvement comprising an open rope-engaging face on said actuating arm, and a rope guiding lip on said actuating arm overlying said rope-engaging face, so that when the fall portion of the rope is brought to bear against said rope engaging face and said rope guiding lip said cam surface is moved away from said closed position and the rope is free to move clear of said opposed rope gripping members.

2. The cam cleat of claim 1 wherein said open rope-engaging face is substantially normal to said base and said rope guiding lip projects laterally away from said face.

3. The cam cleat of claim 1 wherein said rope guiding lip comprises a continuation of said open rope-engaging face.

4. A cam cleat operating to grip a rope between a standing portion and a fall portion of the rope comprising a base, laterally opposed rope gripping members mounted on said base, a cam rope gripping surface on one of said rope gripping members, means for pivotally mounting said one rope gripping member so that rotation of said one member moves said cam surface toward and away from a closed position relative to the opposing rope gripping member, a spring urging said cam surface toward said closed position, an actuating are projecting from said one member in a direction substantially parallel to said base and in an overcenter position when said cam surface is in said closed position, an open rope engaging face on said actuating arm, and a lip on said actuating arm overlying said rope engaging face, whereby bringing the fall portion of the rope to bear laterally against said rope engaging face and upwardly to bear against said lip moves said cam surface away from said closed position and the rope is free to move clear of said opposed rope gripping members.

5. A cam cleat as in claim 4 comprising means for pivotally mounting said other of said rope gripping members on said base.

6. A cam cleat as in claim 5 comprising a cam rope gripping surface on said other rope gripping member.

7. A cam cleat as in claim 5 comprising means for synchronizing the rotation of said rope gripping members.

* * * * *